United States Patent [19]

Tischler et al.

[11] Patent Number: 5,077,674
[45] Date of Patent: Dec. 31, 1991

[54] PERFORMANCE FEEDBACK SYSTEM

[75] Inventors: Ralph H. Tischler, Livonia; George P. Knapp, Washington; Durward W. Roller, Romeo, all of Mich.

[73] Assignee: Chrysler Corporation, Highland Park, Mich.

[21] Appl. No.: 484,948

[22] Filed: Feb. 26, 1990

[51] Int. Cl.$^5$ .............................................. G06F 15/46
[52] U.S. Cl. .................................. 364/468; 364/188; 364/552; 29/33 P
[58] Field of Search ............... 364/468, 478, 188, 189, 364/424.03, 424.04, 424.05, 425, 552; 29/428–431, 33 P, 564, 564.1; 235/375, .385

[56] References Cited

U.S. PATENT DOCUMENTS

| | | | |
|---|---|---|---|
| 4,319,338 | 3/1982 | Grudowski et al. | 364/138 |
| 4,460,966 | 7/1984 | Chynoweth et al. | 364/468 |
| 4,709,337 | 11/1987 | Knapp et al. | 364/468 |
| 4,831,540 | 5/1989 | Hesser | 364/468 |
| 4,870,592 | 9/1989 | Lampi et al. | 364/468 |
| 4,878,176 | 10/1989 | Teranishi et al. | 364/468 |
| 4,956,783 | 9/1990 | Teranishi et al. | 364/468 |
| 4,958,292 | 9/1990 | Kaneko et al. | 364/468 |
| 4,961,148 | 10/1990 | Holda et al. | 364/468 |

Primary Examiner—Jerry Smith
Assistant Examiner—Thomas E. Brown
Attorney, Agent, or Firm—Edward A. Craig

[57] ABSTRACT

The present invention is a method of quality assurance and rectification of defects in the process of assembling a vehicle on a continuously moving assembly line. The method includes the steps of providing a continuously moving assembly line for assembly of vehicles and providing assembly stations along the length of the continuously moving assembly line attended by operators who perform discrete assigned tasks on incomplete vehicles positioned on the continuously moving assembly line as the incomplete vehicles pass by, leading to building of complete vehicles. The method also includes providing an assembly data input terminal at each assembly station, with each data input terminal having a plurality of manually actuatable switches corresponding to a discrete assigned tasks of an operator. The operators manipulate the switches to indicate successful or unsuccessful completion of discrete assigned tasks with respect to specific incomplete vehicles. The steps include communicating the input data from the assembly data input terminals to a central computer and providing a limit switch at each assembly station which is tripped by a vehicle carrier of the assembly line. The steps further include communicating a signal from the tripped limit switch to a sequencing computer and coordinating assembly station and vehicle data with a line tracking number for the previous vehicle of the assembly station.

1 Claim, 6 Drawing Sheets

Prior Art

PERFORMANCE FEEDBACK SYSTEM

BACKGROUND OF THE INVENTION

1. Field of the Invention

The present invention relates generally to assembling a vehicle on a continuously moving vehicle assembly line, and more particularly to a performance feedback system for assembling a vehicle on a continuously moving vehicle assembly line.

2. Description of Related Art

In the early days of assembly line automobile production, a method of vehicle assembly accounting was necessary to insure that all of the options on a custom manufactured vehicle were actually assembled. The automotive industry in turn expanded this method of vehicle accounting by recording vehicle defects encountered during manufacturing as well as the necessary repairs done to correct these defects. In those days, this information was recorded on what was called a "traveling ticket", a paper ticket that traveled with the vehicle along the assembly line.

Presently, with the relatively recent advances in computer technology, a different method is used to track and record vehicle assembly data as the vehicle moves along the assembly line. This method is referred to as the Vehicle Assembly Method disclosed in U.S. Pat. No. 4,709,337, issued Nov. 29, 1987, to inventors Knapp et al, the disclosure of which is hereby incorporated by reference.

The patented Vehicle Assembly Method uses a computer record, called a vehicle line tracking record, that travels along the assembly line with each vehicle, replacing the paper ticket. Each vehicle line tracking record contains information referred to as vehicle build data. Vehicle build data contained within the record consists of information such as the vehicle line tracking number (essentially a vehicle ID number), and assembly related information (what options to include, defects reported during assembly, repairs made during assembly, etc.). The vehicle line tracking record is accessed during vehicle assembly by assembly station operators to determine what operations to perform on the vehicle while it is at their station. Further, it is used to report any defects or repairs made to the vehicle during production. The vehicle line tracking record is also accessed at upgrade assembly stations where repairs are made to vehicles with reported defects.

The hardware, for the Vehicle Assembly Method, consists of several Production Data Terminals (PDT's), linked by computer bus line to Junction Boxes which in turn are connected to Plant DCL's (e.g., "data concentrators" or parallel I/O ports). The line of computer communication finally terminates as the Plant DCL feeds into the Host DCL which is connected to a mainframe computer. The PDT's are data entry terminals which are used to record vehicle assembly data. The PDT's consist of twelve buttons or switches, a Change Sequence switch, End of Operation switch and ten numbered switches. The Change Sequence switch is used by the station operators to correct the vehicle line tracking number displayed on the PDT to correspond with the vehicle line tracking number of the unit in their work station. It does so by incrementing the vehicle's line tracking record and number then downloading it into that assembly work station's PDT. The End of Operation switch is pressed by the operator to indicate that he has completed all required assembly operations on the vehicle regardless of whether or not they were successfully performed. Additionally, pressing the End of Operation switch updates the vehicle line tracking record with the newly inputted information. The remaining numbered switches are pressed by the assembly work station operator as necessary to record any manufacturing defect that is noticed during assembly.

However, there are several disadvantages with the above patented Vehicle Assembly Method. At the beginning of a work shift, if an operator does not verify that the vehicle line tracking number displayed on his PDT corresponds to the vehicle line tracking number of the unit in their work station, inputted information will then be attributed to the wrong vehicle's computer line tracking record until a correction is made. Additionally, if the operator fails to press the End of Operation switch, no input will be attributed to the vehicle's computer line tracking record. If the operator later wants to input data against a vehicle he must use the Change Sequence switch to enter the correct vehicle line tracking number or the operator will continue to report defect data against the wrong vehicle. When a vehicle reaches special repair assembly work stations called upgrade stations, the vehicle's line tracking record is displayed on a CRT notifying the upgrade operator of possible defects. If the vehicle line tracking number was incorrect during input from PDT's, defects will be generated against the wrong vehicle. Thus, a vehicle without any defects may show defects which really belong to a different vehicle. Expensive labor time will be wasted searching vehicles with improperly attributed defect warnings. However, a vehicle which should have shown defect warnings may pass inspection and be sold to a consumer, resulting in expensive warranty costs.

SUMMARY OF THE INVENTION

The present invention is a method of quality assurance and rectification of defects in the process of assembling a vehicle on a continuously moving assembly line. The method includes the steps of providing a continuously moving assembly line for assembly of vehicles and providing assembly stations along the length of the continuously moving assembly line attended by operators who perform discrete assigned tasks on incomplete vehicles positioned on the continuously moving assembly line as the incomplete vehicles pass by, leading to building of complete vehicles. The method also includes providing an assembly data input terminal at each assembly station, with each data input terminal having a plurality of manually actuatable switches corresponding to a discrete assigned tasks of an operator. The operators manipulate the switches to indicate successful or unsuccessful completion of discrete assigned tasks with respect to specific incomplete vehicles. The steps include communicating the input data from the assembly data input terminals to a central computer and providing a limit switch at each assembly station which is tripped by a vehicle carrier of the assembly line. The steps further include communicating a signal from the tripped limit switch to a sequencing computer and coordinating assembly station and vehicle data with a vehicle line tracking number for the previous vehicle of the assembly station.

Accordingly, the present invention offers several advantages over the existing Vehicle Assembly Method design. The present invention virtually eliminates sequencing problems associated with an operator failing to verify his starting sequence number and/or an operator failing to press the End of Operation switch. A sequencing computer automatically downloads to a data input terminal the next correct vehicle line tracking number which should be in that work station.

Other objects, features, and advantages of the present invention will be readily appreciated as the same becomes better understood when viewed in light of the following description and accompanying drawings.

BRIEF DESCRIPTION OF THE DRAWINGS

FIG. 3 is a system schematic incorporating the present invention.

DESCRIPTION OF THE PREFERRED EMBODIMENT

Figure 1:
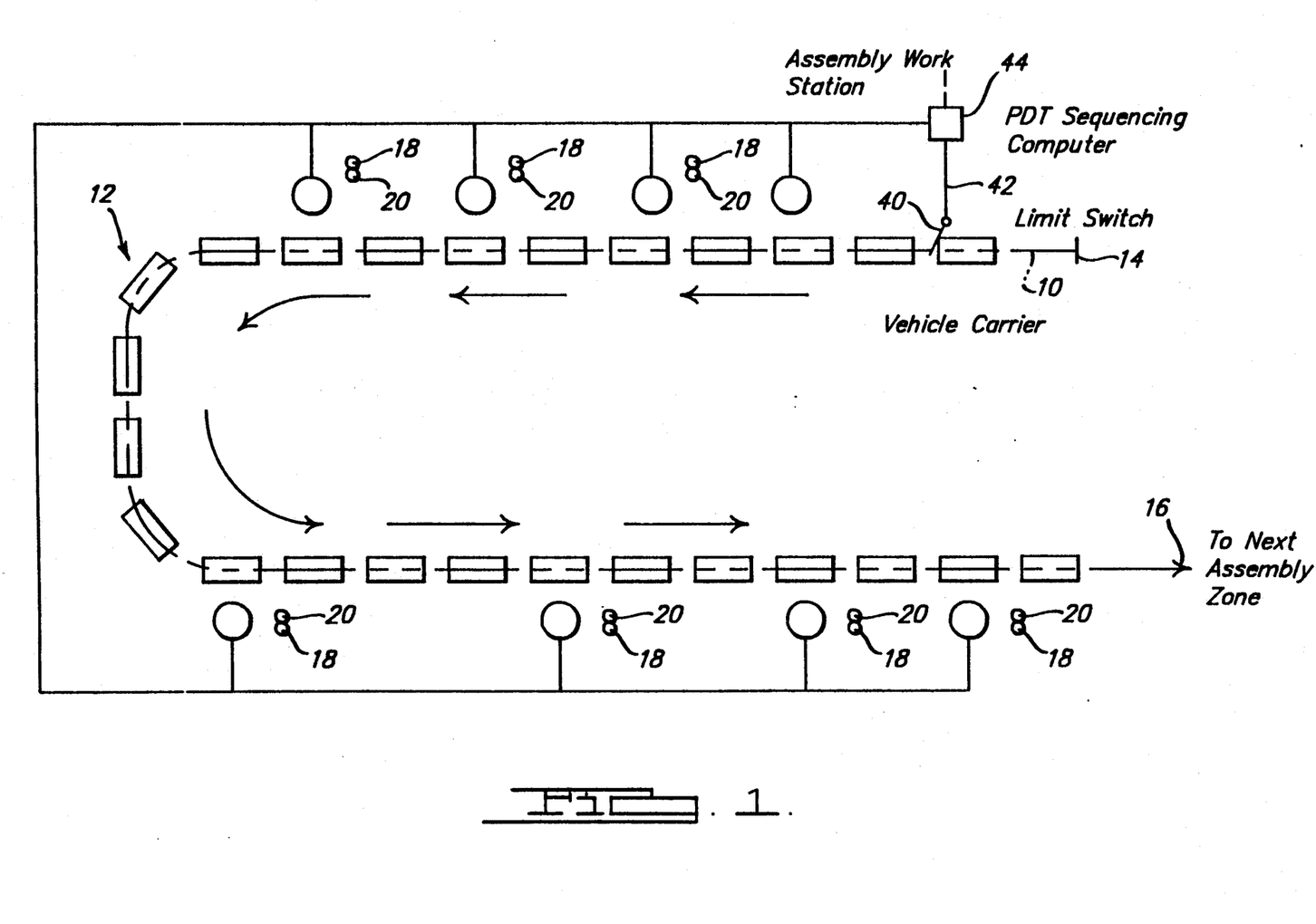
FIG. 1 is a schematic view of a continuously moving assembly line where the present invention is used.

Referring to FIG. 1, it will be noted that one U-shaped segment 10 of a continuously moving assembly line 12 is illustrated in phantom lines. The assembly line 12 is, of course, much more extensive than the illustrated segment to facilitate assembly of a complete vehicle. The assembly line 12 begins at point 14 and ends at arrowhead 16. In modern assembly plants, the assembly line 12 takes the form of a moving track in the floor. Incomplete vehicles ride on the track (FIG. 4) past various assembly stations 18. As will be noted, the assembly stations 18, which may be located on both sides of the assembly line 12, are illustrated by circles. The assembly stations 18 are provided along the length of the continuously moving assembly line 12 and are attended by operators each of whom performs various assigned tasks on incomplete vehicles positioned on the continuously moving assembly line 12 as the incomplete vehicles passes by. This leads to building of complete vehicles.

Figure 2:
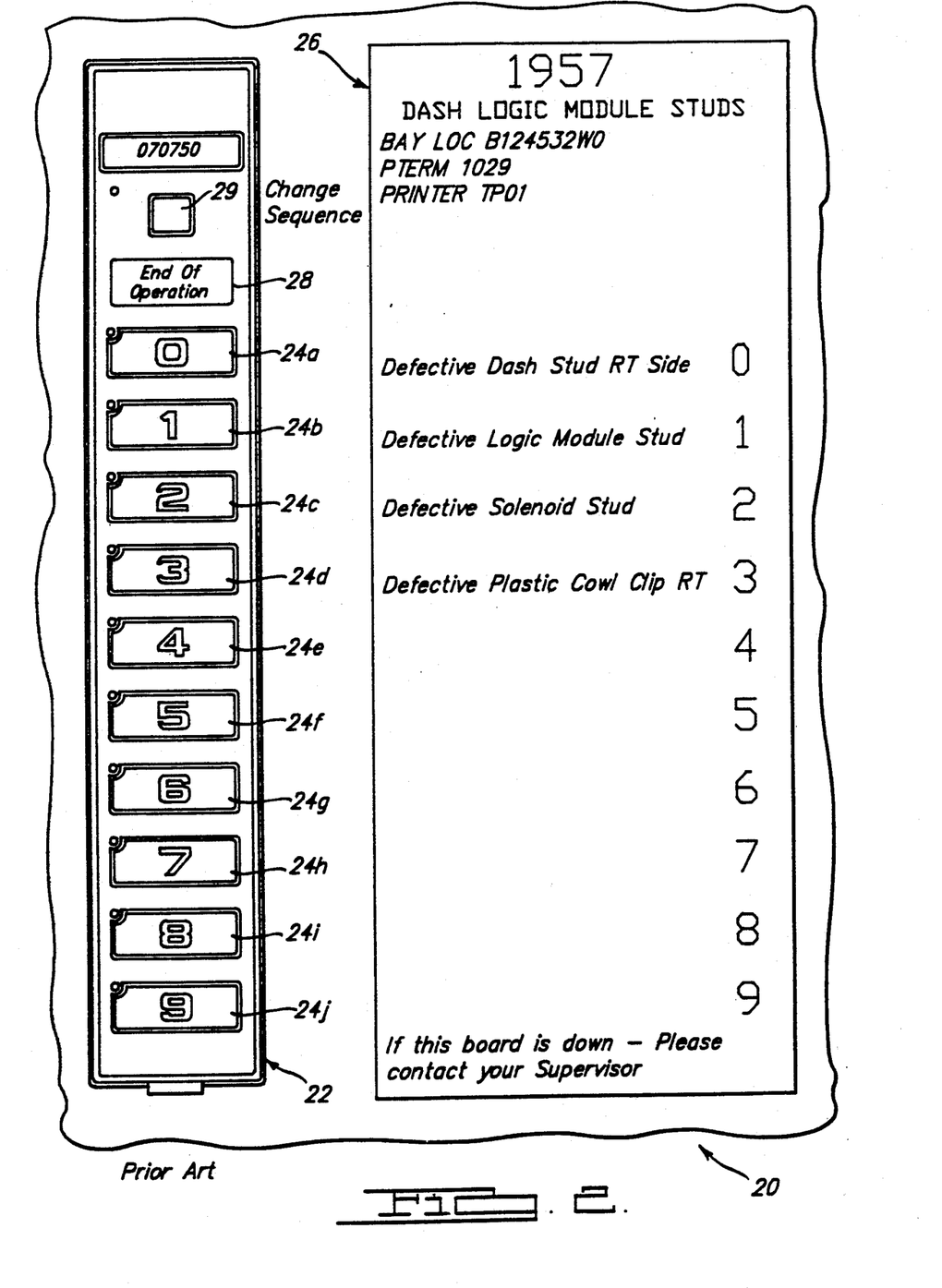
FIG. 2 shows a keypad of a data input terminal used by the operator to input defect and assembly build data into vehicle line tracking records.

An assembly data input or production data terminal (PDT) 20 is provided at each assembly station 18. As shown in FIG. 2, the PDT 20 includes a vertical switch bank 22 which includes manually actuatable buttons or switches 24a-j, each of which carries an identifying numeral, illustratively 0-9, and each of which may correspond to a discrete assigned task of an operator.

A panel 26 is positioned adjacent to the switch bank 22. The panel 26 has a series of vertical numerals which are in alignment with the similar numerals on the switch bank 22. These numerals also run from 0-9 in the illustrated example. Only the first four numerals are used in the illustrative case. The operator at this station has responsibility for four assigned tasks. If any one of these assigned tasks are not correctly completed, he then actuates the appropriate switch to indicate that such task has not been correctly completed. If the operator does not actuate a switch, the indication is that the task has been successfully completed. While the switch actuation has been expressed in the negative, it will be appreciated that it could also be expressed in the positive, that is, the operator pushing only those switches which indicate successful completion of a task. The panel 26 also illustratively includes additional information at the top and bottom thereof.

An additional manually actuatable task completion or End of Operation switch 28 is provided immediately above the switches 24a-j. The End of Operation switch 28, when actuated, indicates to a central computer that all discrete assigned tasks at the associated work station with respect to a specific incomplete vehicle have been completed regardless of whether or not the tasks have been successfully or unsuccessfully completed. This information assures later users of the input data that there is not an assigned task which has not been either successfully or unsuccessfully completed. If the End of Operation switch 28 is not actuated at the appropriate time at an assembly station 18, operators receiving this information at later points, called "upgrade stations" will check each assigned task to be sure that such task has been completed. If such tasks have not been completed, later operators will complete the tasks.

Moreover, each vehicle is assigned a production or vehicle line tracking number so that activities with respect thereto may be recorded thereagainst. Each time a vehicle passes an assembly station 18, the assembly operator actuates another switch 29 located immediately above the End of Operation switch 28. The switch 29 has printed thereon "Change Sequence". When the Change Sequence switch 29 is actuated, a new number will appear on the switch bank 22 immediately above the Change Sequence switch 29 which identifies the next incomplete vehicle; illustratively "070750". All new task completion information will be recorded against this number.

Referring to FIG. 3, an information system 30 according to the present invention is shown. The PDT 20 is linked by computer bus line to a junction box 32. The junction boxes 32 are linked by computer bus line to a secondary junction box 33 which is linked by computer bus line to a plant data concentrator (DCL) 34. The plant DCL 34 is linked by computer bus line to a host DCL 36 which is connected to a mainframe computer 38. It should be appreciated that up to this point, the information system is well known in the art.

According to the present invention, the information system 30 includes s limit switch 40 such as Square D class 9007 model Y190 which is connected by a coaxial digital Input/Output communications cable 42 to a PDT sequencing computer 44 such as the Beta Tech PDT sequencing computer model no. ZC-001-001. The PDT sequencing computer 44 is connected to the secondary junction box 33 and utilizes software or algorithms to do a limited amount of data manipulation. The sequencing software could be reproduced using Fortran, Assembly, C or any other computer programming language common to the art.

Figure 4:
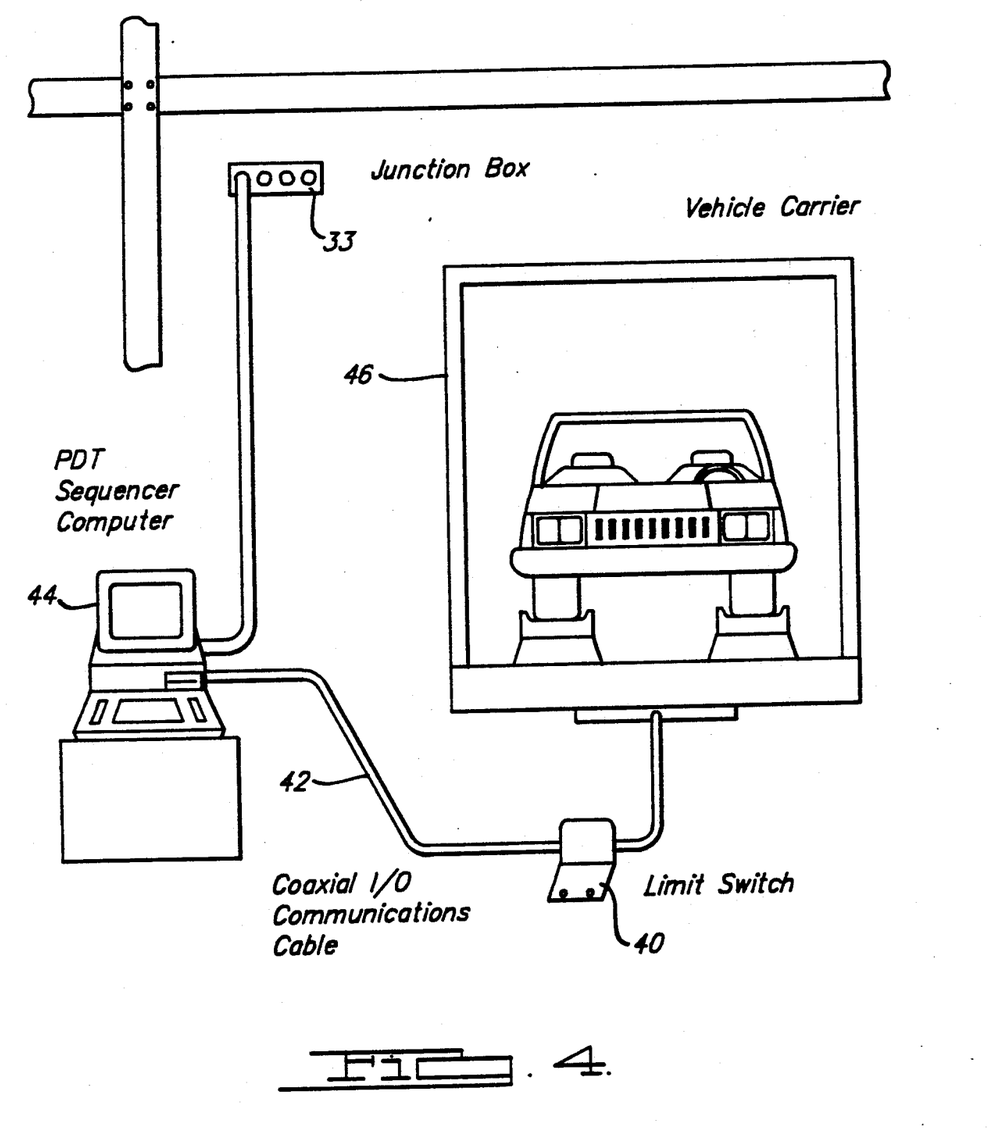
FIG. 4 is a view illustrating an assembly zone incorporating the present invention.

The PDT sequencing computer 44 is of a microcomputer type utilized to interpret and communicate sequencing information from the limit switch 40 to the information system 30. The sequencing software is used to coordinate limit switch feedback, assembly station and vehicle data with the appropriate line tracking record for the vehicle at the assembly station 18. The limit switch 40 is conventional and well known in the art. As shown in FIG. 4, the limit switch 40 is triggered when a vehicle carrier 46 passes over it. The coaxial computer I/0 cable 46 is of a type common to the art and serves as a communications link between the PDT sequencing computer 44 and the limit switch 40. The limit switch 40 is placed in such a position that it triggers every time a vehicle carrier 46 passes over it.

In operation, sequencing is accomplished starting with the vehicle carrier 46 tripping the limit switch 40. As the limit switch 40 trips, it triggers a signal which is sent over the cable 42 to the PDT sequencing computer 44. The sequencing method to be described operates using the limit switch 40 signal as a trigger for the PDT sequencing computer 44 to "move" the computer vehicle line tracking record with the proper vehicle if the assembly station operator fails to press the PDT's End of Operation switch 28. The limit switch 40 is designed to actuate every time a vehicle carrier 46 on the assembly line conveyor enters an assembly zone (there are preferably five assembly zones: Body, Paint, Chassis, Final and Trim). The PDT sequencing computer 44 reacts to the tripping of the limit switch 40 by sending a signal through the secondary junction box 33 to the rest of the PDT's 20 in that assembly zone. The signal causes the PDT's 20 to automatically increment the vehicle line tracking (ID) number (See FIG. 5, block 60) if the operator has failed to press the End of Operation switch 28, thereby assuring proper vehicle sequencing.

Figure 5:
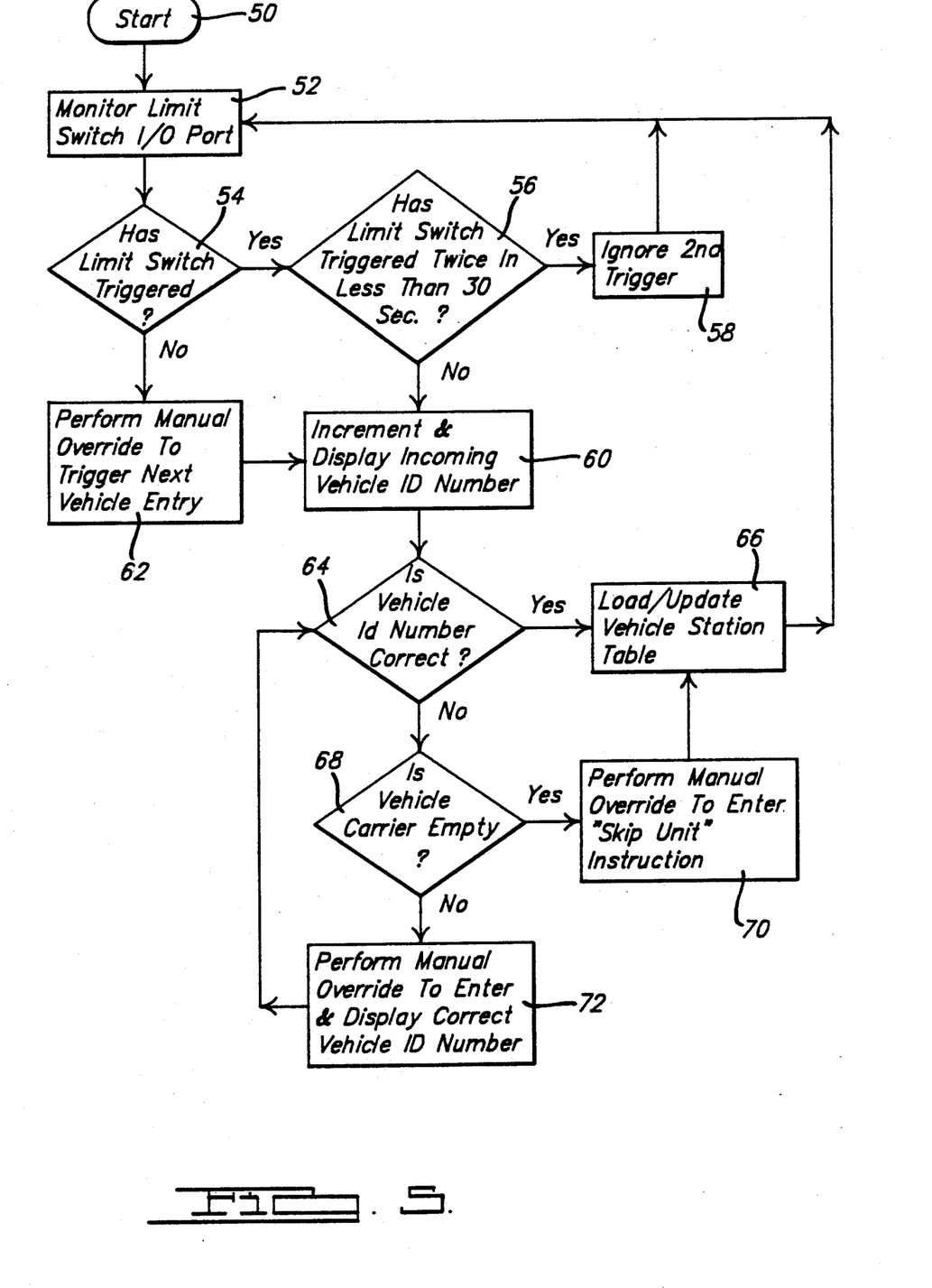
FIG. 5 is a flowchart of a method of sequencing incorporated by the present invention.
Figure 6:
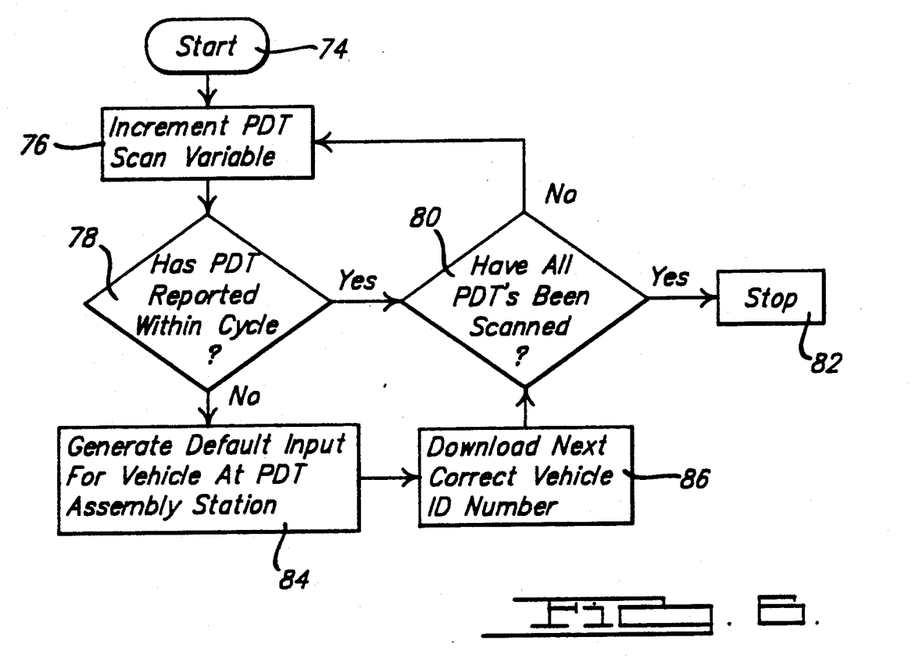
FIG. 6 is a flowchart of a method of scanning incorporated by the present invention.
Figure 7:
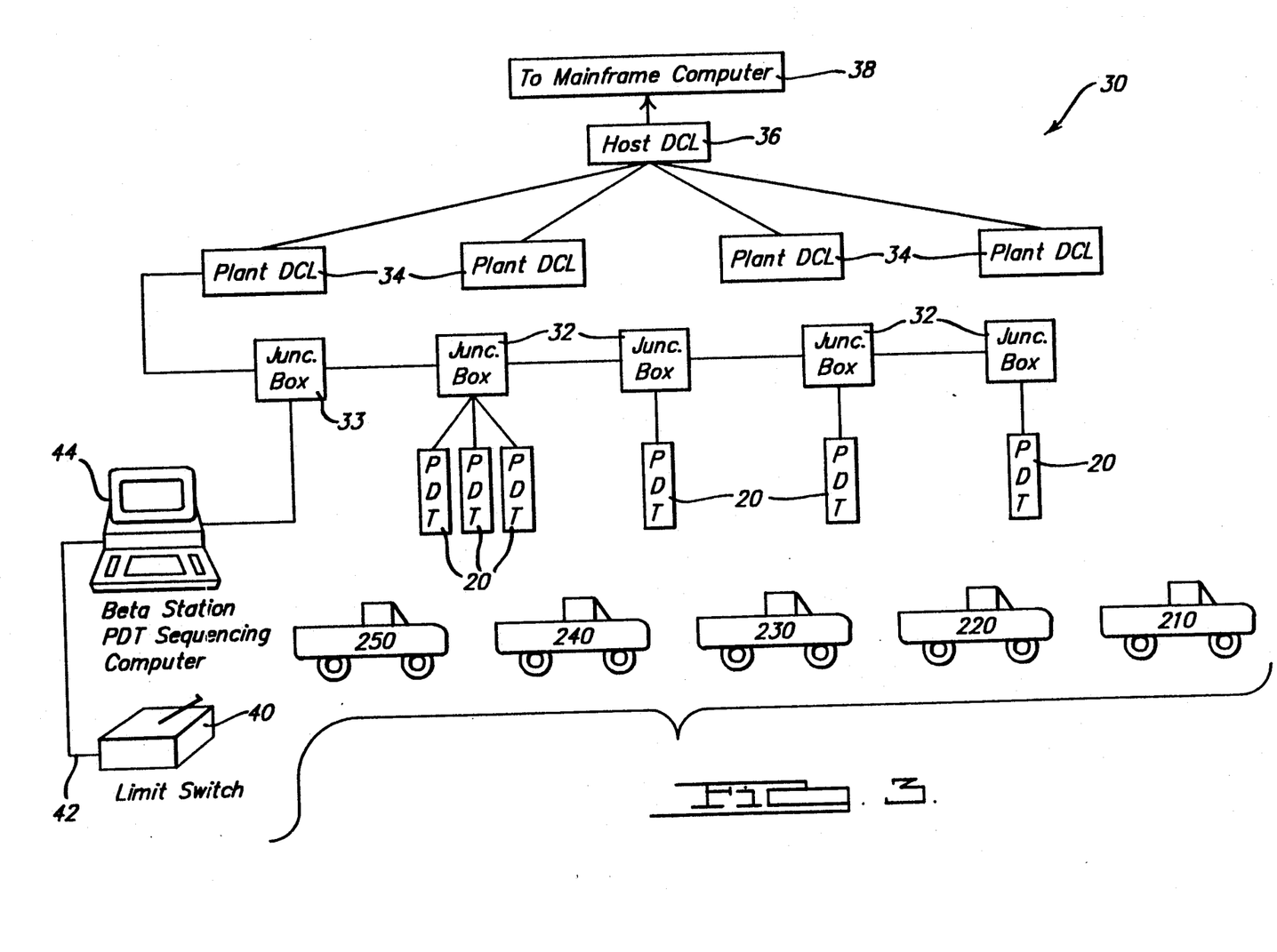
FIG. 7 is a flowchart of a method of input checking incorporated by the present invention.

Referring to FIG.'S 5, 6, and 7, flowcharts of a method according to the present invention are used to ensure assembly line sequencing. It must be noted that the methods illustrated by the three flowcharts occur simultaneously to sequence production. FIG. 5 represents a flowchart of the PDT Sequencing method. FIG. 6 represents a flowchart of the PDT scanning method or routine that is resident in the plant DCL 34. FIG. 7 represents a flowchart of the PDT input checking method or routine that is resident in every PDT 20 within the assembly station 18.

In FIG. 5, the sequencing method starts in bubble 50 with the next vehicle carrier 46 entering the assembly station 18. The sequencing method advances to block 52 and monitors the I/0 port of the limit switch 40. The sequencing method advances to diamond 54 and determines whether the limit switch 40 has been triggered by the vehicle carrier 46 based upon the monitored I/0 port in block 54.

If the limit switch 40 has been tripped by the next vehicle carrier 46, the sequencing method advances to diamond 56 to see if the limit switch 40 was falsely triggered by determining whether or not the limit switch 40 was triggered twice within a predetermined time period such as 30 seconds. If the limit switch 40 has been triggered twice within the predetermined time period, the sequencing method advances to block 58 and ignores the second triggering of the limit switch 40. The sequencing method then branches back to block 52 and begins once again to monitor the I/0 port of the limit switch 40.

In diamond 56, if the limit switch 40 has not been triggered twice during the preceding 30 seconds, the sequencing method advances to block 60 and increments and displays the incoming vehicle's line tracking or identification (ID) number on the CRT of the PDT sequencing computer 44.

In diamond 54, if the limit switch 40 has not been triggered, the sequencing method advances to block 62 and performs a manual override to trigger the next vehicle entry. The sequencing method would then proceed to block 60, previously described, where it would increment and display the incoming vehicle's identification number.

From block 60, the sequencing method advances to diamond 64 and determines whether the vehicle line tracking or identification (ID) number is correct. This is done by comparing the vehicle ID number to a master sequencing record containing the vehicle numbers and their order.

If the vehicle ID number is correct, the sequencing method advances to block 66 and loads and updates the vehicle station table. The vehicle station table is a software table which contains a "slot" for every assembly work station 18 under control of the PDT sequencing computer 44. The sequencing method then branches to block 52 and proceeds once again to monitor the I/O port of the limit switch 40.

In diamond 64, if the vehicle ID number is not correct, the sequencing method advances to diamond 68 and a check is made to see if the vehicle carrier 46 is empty. This may be performed visually or by a photocell of any suitable hardware. If the vehicle carrier 46 is empty, the sequencing method advances to block 70 and performs a manual override to enter a "skip unit" instruction or command. The "skip unit" command ensures that vehicle build data will not be entered for an empty vehicle carrier 46 at any assembly work station 18 under control of the PDT sequencing computer 44. The sequencing method then continues on to block 66, previously described, updating the vehicle station table. Finally, a branch back to block 52 is made, to once again monitor the I/0 port of the limit switch 40.

In diamond 68, if the vehicle carrier 46 is empty, the sequencing method advances to block 72 and performs a manual override to enter and/or display the correct vehicle ID number. The sequencing method then advances to diamond 64, previously described, to check once again if the vehicle ID number is correct. If the vehicle ID number is correct, the sequencing method advances to block 66 and updates the vehicle station table and branches back to block 52 to resume monitoring of the I/0 port of the limit switch 40.

Referring to FIG. 6, a flowchart illustrates a portion of the sequencing method that resides within the plant DCL 34. This portion is designed to scan all PDT's 20 within the assembly zone to verify reporting of assembly work stations 18. Reporting will be positive if the operator has pressed the End of Operation switch 28 before the vehicle left the work station 18. The method scans the PDT's 20 for a predetermined time called a polling cycle. The length of time scanned is determined by the polling cycle time constant. The value of the time constant reflects the typical amount of time that it takes for a vehicle carrier 46 to pass through an assembly work station 18. For exemplary purposes, it will be arbitrarily assumed that the value of the polling cycle time will be ten seconds, although the preferred embodiment could utilize a different value. The scanning method of FIG. 6 scans every PDT 20 within the assembly station 18 during each ten second polling cycle to verify operator End of Operation reporting.

As illustrated in FIG. 6, the scanning method starts in bubble 74 and advances to block 76 to increment the PDT scan variable. The PDT scan variable keeps track of which PDT 20 is to be scanned. The scanning method then proceeds to diamond 78 where the scanned PDT 20 is checked to determine if it has reported during the polling cycle.

If the scanned PDT 20 has reported as a result of the operator pressing the End of Operation switch 28 during the polling cycle, the scanning method advances to diamond 80 and determines whether or not all of the PDT's 20 have been scanned. If all of the PDT's 20 have been scanned, the scanning method advances to block 82 and resets itself and waits for the beginning of another polling cycle. At the beginning of the next polling cycle, the scanning method will restart by advancing to block 76 and incrementing the PDT scan variable.

In diamond 78, if the scanned PDT 20 has not reported within the polling cycle, the scanning method advances to block 84 and generates a default input for the vehicle at the PDT assembly station 18. The default input is entered into the vehicle line tracking record for the non-reporting station. This default input acts as a flag so that the vehicle is inspected and repaired at the upgrade assembly station for possible defects. The scanning method then advances to block 86 and downloads the incoming or next correct vehicle ID number into the PDT 20. The scanning method then advances to diamond 80, previously described, to check to see if all of the PDT's 20 have been scanned.

Referring to FIG. 7, a flowchart of input checking method is illustrated. This part of the sequencing software is engaged when the operator inputs information into the PDT 20 and then presses the End of Operation switch 28.

Upon pressing the End of Operation switch 28, the input checking method begins in bubble 88 and advances to block 90 to verify PDT input information with that contained in the vehicle station table. The method then advances to diamond 92 where a query is made to see if the PDT input information is correct or has been attributed to the vehicle actually at the assembly work station 18.

If the information has been correctly inputted for the vehicle at the assembly work station 18, the method advances to block 94 where it processes the input, adding it to the vehicle's line tracking record. The method advances to block 94 where it awaits to verify the next PDT input. If the input has been incorrectly attributed to the wrong vehicle in diamond 92, the method advances to block 96 and generates default input information for the vehicle presently at the assembly work station 18. This default information is included in the vehicle's line tracking record, flagging the vehicle so that it is thoroughly inspected at the upgrade work station. Next, the method advances to block 98 and downloads the subsequent or next correct incoming vehicle's ID number, then proceeds to block 94, previously described, to process the input, and branches to block 90, restarting the PDT input checking sequence over again.

Accordingly, the sequencing computer of the present invention automatically increments and downloads the vehicle identification number in the PDT Display for each assembly operator on the line who fails to press the End of Operation switch. This is also accomplished by the limit switch trigger or AVI reader. Whenever the PDT sequencing computer is required to download the next vehicle identification number because either an incorrect number had been entered or the operator failed to press the End of Operation switch, the Sequencer will automatically generate up to ten defects from the PDT for the vehicle which was in that work station. This feature is based on input/output masks which are defined within the PDT sequencing computer. This feature also ensures that unreported vehicles will be thoroughly inspected and repaired at the upgrade station.

Eliminating this major sequencing problem ensures that defects, repairs and any other operator recorded information will be recorded for each vehicle in its appropriate vehicle line tracking record reduces production costs and ensures quality control. The present invention helps prevent costly mixups such as these by virtually assuring defect reporting against the proper vehicle.

The modularity of the present invention allows the addition of one or more PDT sequencing computers to the assembly line sequencing system as are necessary. The design is also flexible in that it will not affect production if one or all PDT Sequencers fail. The present invention also offers sequencing flexibility allowing assembly line cut-ins (vehicle added) or cut-outs (vehicle removed) without mixing up line sequencing.

The present invention has been described in an illustrative manner. It is to be understood that the terminology which has been used is intended to be in the nature of words of description rather than of limitation.

Modifications and variations of the present invention are possible in light of the above teachings. Therefore, within the scope of the appended claims, the present invention may be practiced otherwise than as specifically described.

What is claimed is:

1. A method of quality assurance and rectification of defects in the process of assembling a vehicle on a continuously moving assembly line comprising the steps of:
   a. providing a continuously moving assembly line for assembly of vehicles;
   b. providing assembly stations along the length of the continuously moving assembly line attended by operators who perform discrete assigned tasks on incomplete vehicles positioned on the continuously moving assembly line as the incomplete vehicles pass by, leading to building of complete vehicles;
   c. providing an assembly data input terminal at each assembly station, with each data input terminal having a plurality of manually actuatable switches corresponding to a discrete assigned tasks of an operator;
   d. the operators manipulating the switches to indicate successful or unsuccessful completion of discrete assigned tasks with respect to specific incomplete vehicles;
   e. providing a manually actuatable task completion switch on each assembly data input terminal which, when actuated, indicates to the central computer that all discrete assigned tasks at the associated work station with respect to a specific incomplete vehicle have been completed regardless of whether or not the tasks have been successfully or unsuccessfully completed;
   f. manipulating the task completion switch at the appropriate time by an operator at an assembly station if all discrete assigned tasks on a specific incomplete vehicle have been completed and communicating this information to the central computer;
   g. communicating the input data from the assembly data input terminals to a central computer;
   h. providing a limit switch which is tripped by a vehicle carrier of the assembly line;

i. communicating a signal from the tripped limit switch to a sequencing computer;
j. scanning data input terminals at the sequencing computer within an assembly zone to verify reporting at each assembly work station;
k. determining whether each assembly work station has reported within a predetermined time period;
l. generating default input data for a vehicle for any assembly work station which has not reported within the predetermined time period; and
m. loading the default input data into the next correct vehicle identification number for each assembly work station.

* * * * *